United States Patent
Mori et al.

[19]

[11] Patent Number: 6,035,713
[45] Date of Patent: Mar. 14, 2000

[54] VIBRATING GYROSCOPE

[75] Inventors: Akira Mori, Nagaokakyo; Akira Kumada, Otsu; Yoshio Kawai, Ibaragi, all of Japan

[73] Assignee: Murata Manufacturing Co., Ltd., Japan

[21] Appl. No.: 09/146,885

[22] Filed: Sep. 3, 1998

[30] Foreign Application Priority Data

Sep. 12, 1997 [JP] Japan .................................. 9-268058

[51] Int. Cl.[7] .................................................. G01C 19/00
[52] U.S. Cl. ............................................................ 73/504.14
[58] Field of Search ........................... 73/504.14, 504.12, 73/504.04, 504.03, 504.02

[56] References Cited

U.S. PATENT DOCUMENTS 5,349,261  9/1994  Fujimoto et al. ........................ 310/321
5,635,647  6/1997  Heinouchi ................................. 73/662

*Primary Examiner*—Richard A. Moller
*Attorney, Agent, or Firm*—Ostrolenk, Faber, Gerb & Soffen, LLP

[57] ABSTRACT

A vibrating gyroscope includes a bar-shaped vibrator and a support member. The bar-shaped vibrator includes a drive element for vibrating the bar-shaped vibrator and a detection element for detecting the vibration of the bar-shaped vibrator. The bar-shaped vibrator has two grooves therein which extend along a direction perpendicular to a longitudinal direction of the bar-shaped vibrator in the vicinity of two node points of the vibration of the bar-shaped vibrator, respectively. The support member has a shape in which two arch portions held in a non-horizontal direction are connected by two connecting portions at both ends of the arch portions. The arch portions of the support member are connected to the bar-shaped vibrator at respective bottoms of the grooves thereof.

8 Claims, 15 Drawing Sheets

VIBRATING GYROSCOPE

BACKGROUND OF THE INVENTION

1. Field of the Invention

The present invention relates to a vibrating gyroscope, and more particularly to a vibrating gyroscope used in a video camera or the like to detect external vibrations such as hand shaking by detecting a rotational angular velocity and cancel out the vibrations on the basis of the detected information. The invention also relates to a method for adjusting the above type of vibrating gyroscope.

2. Description of the Related Art

FIG. 18 is a perspective view of an example of a conventional vibrating gyroscope. This vibrating gyroscope 100 comprises a vibrator 101 of a substantially regular triangle bar shape. The vibrator 101 is composed of a vibrating body 102 of a substantially regular triangle bar shape made up of a permanently elastic metal and piezoelectric elements 103a, 103b, and 103c which are substantially rectangular in shape and which are attached nearly in the center of each of the three side surfaces of the vibrating body 102.

The piezoelectric element 103c is used for input of a drive signal, and the piezoelectric elements 103a and 103b are used for detection and feedback. On both surfaces of each of the piezoelectric elements 103a, 103b, and 103c electrodes (not shown) are formed, and one of them is joined to the vibrating body 102 and the other electrode is connected to one end of the lead wires 106a, 106b, and 106c by soldering, etc. The ends of the lead wires 106a, 106b, and 106c which extend to the vicinity of the nodal point of the vibrating body 102 are fixed thereto using elastic adhesive 107, and the other end of the lead wires 106a, 106b, and 106c are led to the surface of the mounting base 105 and connected to a circuit (not shown).

Also, in the vicinity of nodal points in the first order vibration mode on the edge line portion 102d of the vibrating body 102 of the vibrator 101, metallic support members 104 and 104 having the shape of a square letter "C" made up of a thin wire of a high elasticity are joined by, for example, soldering. And the end portions of the support members 104, 104 are joined to one main surface of the mounting base 105 made up of glass epoxy material, etc., and the vibrating body 10 is supported by the mounting base 105 through the support members 104, 104.

And although not particularly shown, between the piezoelectric element 103c for input of a drive signal and the piezoelectric elements 103a and 103b for detection and feedback, a drive circuit as a feedback loop for self-oscillation of the vibrating body 102 is connected, and because of this drive circuit the vibrator 102 generates bending vibration at a right angle to the surface on which the piezoelectric element 103c is provided. This bending vibration is hereinafter referred to as a drive mode (fx mode). While the bending vibration in the drive mode is generated, bending vibration in the direction perpendicular to the drive mode is induced owing to the Coriolis force when the rotation around the axis of the vibrating body 102 is added. This bending vibration is called a detection mode (fy mode) in the following explanation. The bending vibration in the detection mode causes an output difference between the piezoelectric elements 103a and 103b proportional to the angular velocity, and the angular velocity can be detected by detecting the output difference using a detection circuit.

In the conventional vibrating gyroscope 100, there has arisen the problem that the vibration of the vibrator 101 leaks to the mounting base 105 through the four legs of the support members 104, 104. In addition, when the change of external conditions such as impact, vibration, temperature change, etc. affects the vibrating gyroscope 100, the leakage of the vibration from the four legs of the support members 104, 104 is different. This causes the vibration of the vibrator 101 to become unbalanced in such a way that it becomes difficult to detect an accurate angular velocity. Also, there arises another problem in that the vibrating gyroscope 100 has had a weakness at impact because the support members 104, 104 are formed using a thin wire material.

In addition, the vibrating gyroscope shown in FIG. 18 has a problem that the sensitivity of detecting angular velocity is greatly varied as shown in a graph of FIG. 21 when the frequency characteristic (resonance characteristic) becomes different because of the change of external conditions. That is, as these vibrating gyroscopes are formed so that the resonance frequency in the fx mode coincides with the resonance frequency in the fy mode, they have a good detection sensitivity. However, because the slope of the curve showing the resonance characteristic in the fy mode is sharp, there is a concern that the detection sensitivity may be greatly changed when the resonance frequency in the fy mode corresponding to the resonance frequency in the fx mode is changed owing to the change of external conditions.

For the foregoing reasons, there is a need for a vibrating gyroscope which is hardly affected by the change of external conditions and is able to accurately detect angular velocity.

SUMMARY OF THE INVENTION

The present invention is directed to a vibrating gyroscope that satisfies this need. The vibrating gyroscope comprises a bar-shaped vibrator and a support member. The bar-shaped vibrator includes a drive element for vibrating the bar-shaped vibrator and a detection element for detecting the vibration of the bar-shaped vibrator and has two grooves therein which extend along a direction perpendicular to a longitudinal direction of the bar-shaped vibrator in the vicinity of two node points of the vibration of the bar-shaped vibrator, respectively. The support member has two portions extending within the two grooves, respectively, for supporting the bar-shaped vibrator.

Preferably, the support member has a shape in which two arch portions held in a non-horizontal direction are connected by two connecting portions at both ends of the arch portions. The arch portions of the support member are connected to the bar-shaped vibrator at respective bottoms of the grooves thereof.

Preferably, the arch portions and connecting portions of the support member are integrally formed with each other.

The arch portions and connecting portions of the support member may have a wire shape. Alternatively, the arch portions and connecting portions of the support member have a strip shape.

The support member may include another connecting portion which is connected between middles of the connecting portions.

Moreover, the support member may be formed by bending opposite sides of a flat plate having the square ring shape in the same direction so that the arch portions in the shape of a reversed square bottomed letter "U" are formed.

The bar-shaped vibrator may have a polygonal cross-section, and each of the grooves is provided in two adjacent side faces of the bar-shaped vibrator. Alternatively, the bar-shaped vibrator has a polygonal cross-section, and each of the grooves is provided in one side face of the bar-shaped vibrator.

Depths of the grooves are preferably adjusted such that resonance frequencies of two directions perpendicular with each other have a predetermined difference. The predetermined difference is preferably within the range of about 50 to 150 Hz.

For the purpose of illustrating the invention, there is shown in the drawings several forms which are presently preferred, it being understood, however, that the invention is not limited to the precise arrangements and instrumentalities shown.

DETAILED DESCRIPTION OF PREFERRED EMBODIMENTS

Hereinafter, the preferred embodiments of the present invention are explained in detail with reference to the drawings.

Figure 1:
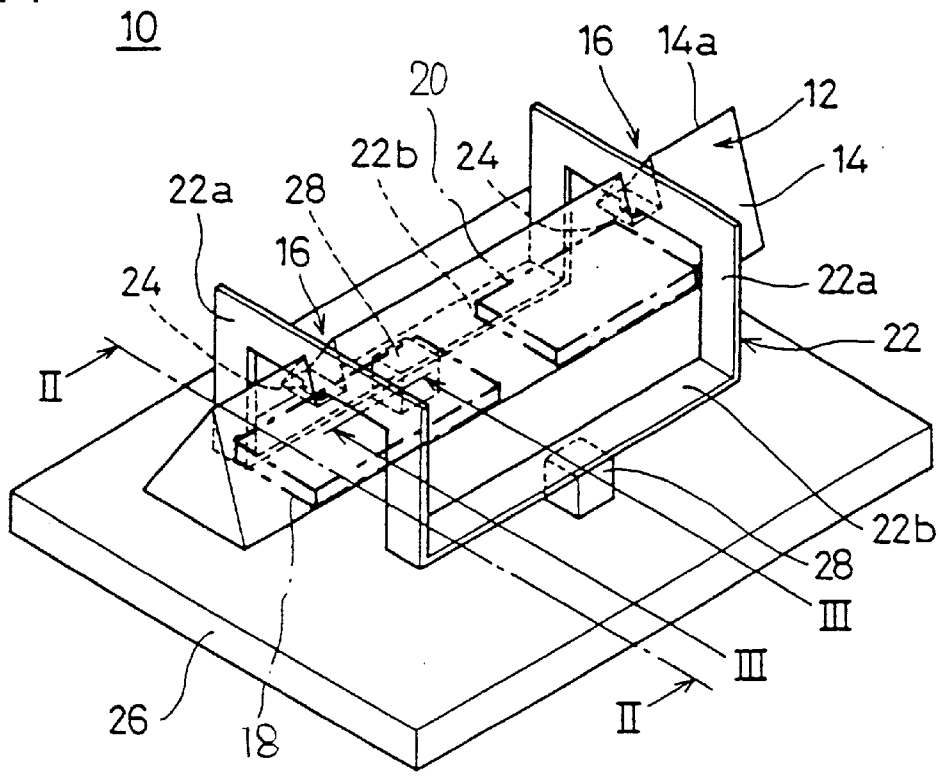
FIG. 1 is a perspective view showing an embodiment of a vibrating gyroscope relating to the present invention.
Figure 2:
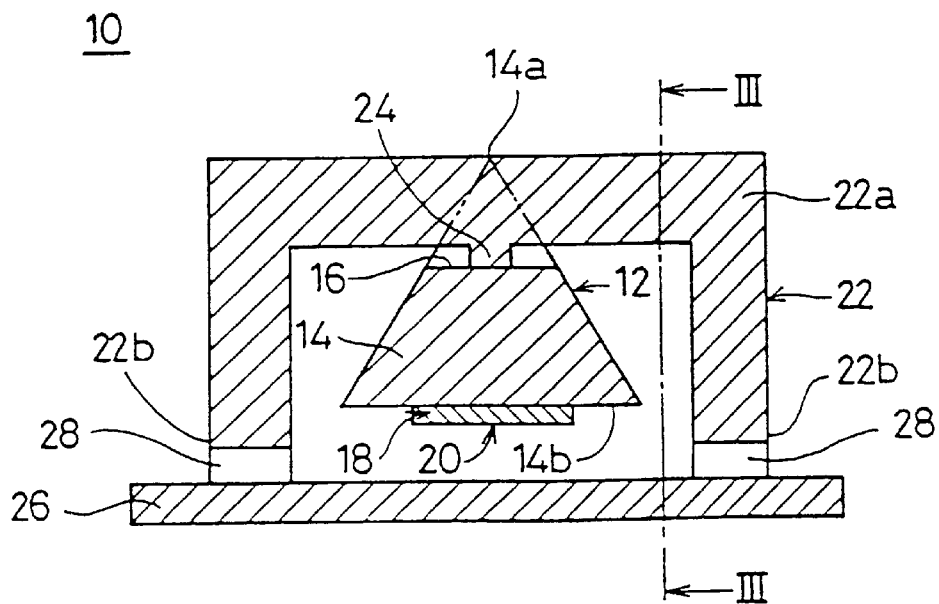
FIG. 2 is a cross-sectional view taken along line II—II of FIG. 1.
Figure 3:
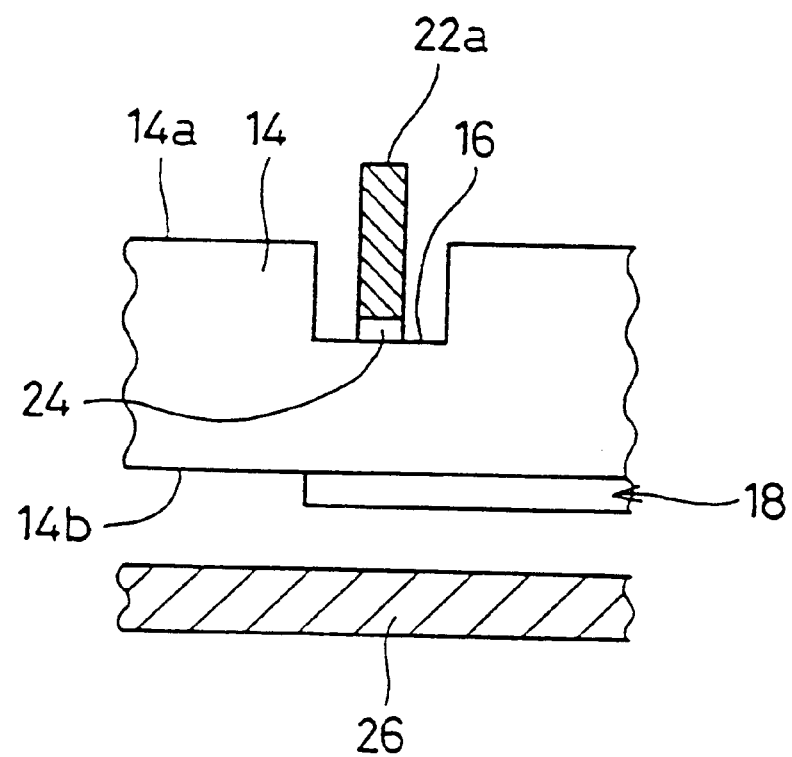
FIG. 3 is a cross-sectional view taken along line III—III of FIGS. 1 and 2.

FIG. 1 is a perspective view of a vibrating gyroscope 10 according to a first embodiment of the present invention. FIG. 2 is a cross sectional view taken along line II—II of the gyroscope 10 and FIG. 3 is a sectional view taken along line III—III. The vibrating gyroscope 10 shown in FIG. 1 comprises a vibrator 12. The vibrator 12 is composed of a vibrating body 14, a drive piezoelectric element 18, and a detection piezoelectric element 20.

The vibrating body 14 is formed generally of a material for producing mechanical vibration such as elinvar, iron-nickel alloy, quartz, glass, rock-crystal, ceramics, etc. In this embodiment, the vibrating body 14 is formed of elinvar and has a regular triangle prism shape. Grooves 16, 16 each having a depth in the cross sectional direction of the vibrating body 14 are provided at two points corresponding to the nodal points on an edge line 14a out of three edge lines of the vibrating body 14. The grooves 16, 16 have a triangular shape in a direction parallel to the cross sectional direction of the vibrating body 14 (FIG. 2) and a rectangular shape in a direction perpendicular to the cross sectional direction (FIG. 3). Moreover, the grooves 16, 16 are formed so as to have a width at least wider than the thickness of a support member 22 to be described later along the longitudinal direction of the vibrating body 14. Note that, in this specification, the cross sectional direction of the vibrating body 14 means the transversal direction at a right angle to the longitudinal direction of the vibrating body 14.

Referring to FIG. 2, on the side surface 14b opposite to the edge line 14a of the vibrating body 14 in its cross sectional direction, a drive piezoelectric element 18 is provided for exciting a bending vibration in the fx mode on the vibrating body 14 and a detection piezoelectric element 20 is provided for detecting the deformation of the vibrating body 14. In the vibrating gyroscope shown in FIGS. 1–3, the side surface 14b means the bottom surface of the vibrator 12. Next, the elements 18 and 20 are explained with reference to FIGS. 4 and 5.

Figure 4:
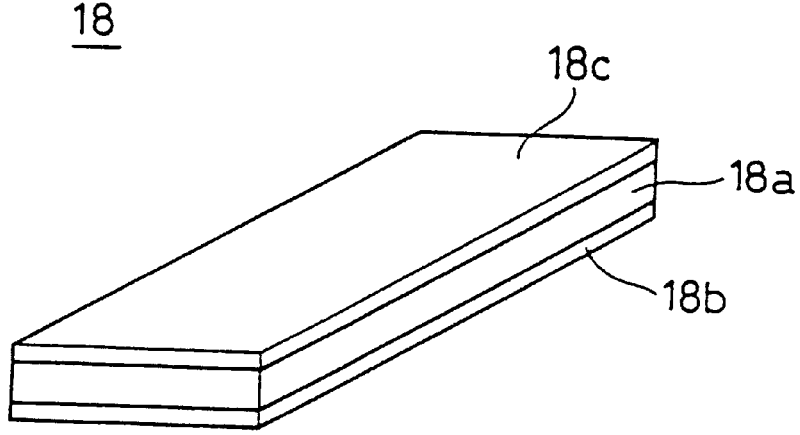
FIG. 4 is a perspective view showing an example of a drive piezoelectric element.
Figure 6:
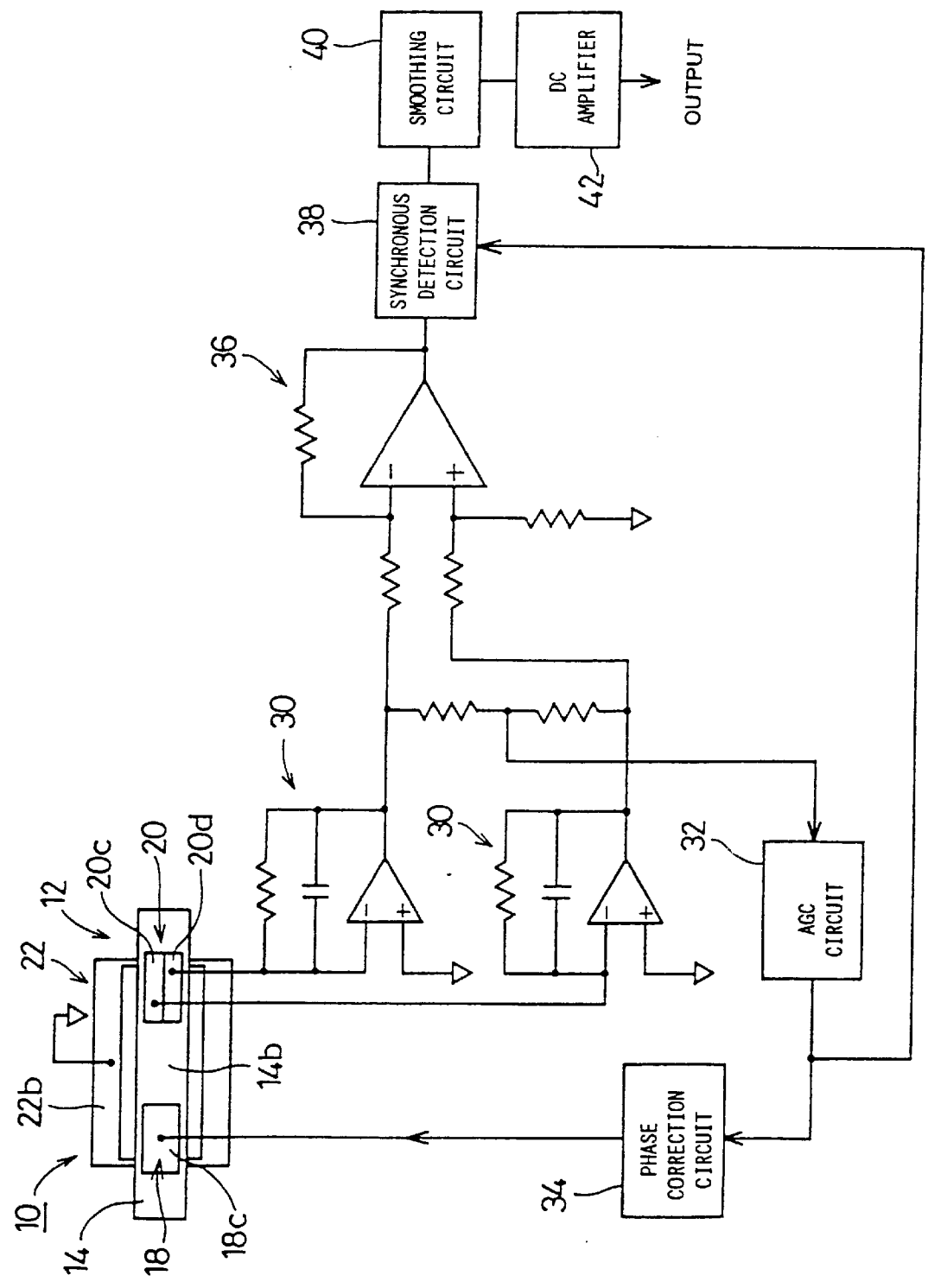
FIG. 6 is a circuit diagram of the vibrating gyroscope shown in FIG. 1.

FIG. 4 is a perspective view showing one example of the drive piezoelectric element 18. The drive piezoelectric element 18 includes one piezoelectric plate 18a made up of, for example, piezoelectric ceramics. Electrodes 18b and 18c are formed on opposite surfaces of the piezoelectric plate 18a. The drive piezoelectric element 18 is attached on the side surface 14b of the vibrating body 14 so that one end portion of the drive piezoelectric element 18 in its longitudinal direction overlaps with the location corresponding to one of the nodal points in the vibrating body 14 as shown in FIG. 6. At this time the electrode 18b of the drive piezoelectric element 18 is joined to the vibrating body 14 so as to make electrical contact with the vibrating body 14.

Figure 5:
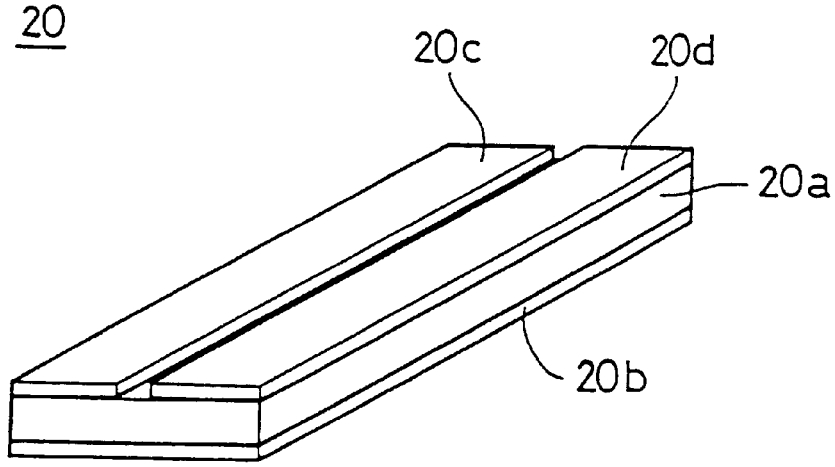
FIG. 5 is a perspective view showing an example of a detection piezoelectric element.

FIG. 5 is a perspective view showing one example of the detection piezoelectric element 20. The detection piezoelectric element 20 includes one piezoelectric plate 20a made up of, for example, piezoelectric ceramics. An electrode 20b is formed over the entire surface on one surface of the surfaces opposite to each other in the thickness direction of the piezoelectric plate 20a. Divided electrodes 20c and 20d are arranged on another surface of the piezoelectric plate 20a so as to be spaced in a direction perpendicular to the longitudinal direction of the piezoelectric plate 20. The detection piezoelectric element 20 is attached on the side surface 14b of the vibrating body 14 so that one end portion of the detection piezoelectric element 20 in its longitudinal direction overlaps with the location corresponding to the other nodal point in the vibrating body 14 as shown in FIG. 6. Then, an electrode 20b of the detection piezoelectric element 20 is joined to the vibrating body 14 so as to make electrical contact with the vibrating body 14.

Next, the construction of the support of the vibrator 12 in the vibrating gyroscope 10 shown in FIG. 1 is explained with reference to FIGS. 1 through 3. The vibrating gyroscope 10 comprises a support member 22 to support the vibrator 12 so that it is suspended. The support member 22 is made of a metal such as elinvar and has a shape in which two arch portions 22a, 22a are held in a non-horizontal direction, preferably in a substantial vertical direction, and are connected by two connecting portions 22b, 22b at both ends of the arch portions 22a, 22a such that the arch portions 22a, 22a and connecting portions 22b, 22b create a cubic space therebetween. The arch portions 22a, 22a may be rectangular, triangular, oblong, circular, or the like. Preferably, the arch portions 22a, 22a and the connecting portions 22b, 22b are formed integrally into the support member 22. The arch portions 22a and connecting portions 22b may have a wire shape or a strip shape, but it is more preferable to employ the strip-shaped arch portions 22a and the strip-shaped connecting portions 22b in view of mechanical strength.

For example, as shown in FIG. 1, the support member 22 may be formed by bending opposite sides of a flat plate having the square ring shape in the same direction so that the arch portions 22a, 22a in the shape of a reversed square bottomed letter "U" are formed. Protrusions 24, 24, for example, of a nearly rectangular shape are integrally formed respectively in the middle of the arch portions 22a, 22a of the support member 22. Both of the arch portions 22a, 22a of the support member 22 are inserted into the grooves 16, 16 of the vibrator 12, respectively, with the tip portions of the protrusions 24, 24 in contact with the bottom of the grooves 16, 16 and joined thereto, for example, by welding. Except for the protrusions 24, 24, the other portions of the sides 22a, 22a do not contact the inside surface of the grooves 16, 16. In this way the support member 22 are joined to the vicinity of the nodal points of the vibrator 12 and electrically connected to the vibrator 12.

The vibrating gyroscope 10 further comprises a plate-like mounting base 26 made up of metal, etc. On the mounting base 26, for example, two mounting block 28, 28 are attached by means of welding, etc. The middle point of the connecting portions 22b of the support member 22 is joined onto the mounting blocks 28, 28, respectively. Thus, the vibrator 12 is supported on the mounting base 26 through the mounting blocks 28 so as to be suspended by the support member 22.

Next, mainly with reference to FIG. 6, the electrical connection and operation of the vibrating gyroscope 10 in FIG. 1 is explained.

As shown in FIG. 6, current-voltage (I-V) conversion circuits 30, 30 are connected to the divided electrodes 20c and 20d of the detection piezoelectric element 20 in the vibrating gyroscope 10, respectively. The output from the two I-V conversion circuits 30, 30 is summed, and the resultant signal is input to an auto gain control (AGC) circuit 32. On the output side of the AGC circuit 32, a phase correction circuit 34 and a synchronous detection circuit 38 are connected. The output side of the phase correction circuit 34 is connected to the electrode 18c of the drive piezoelectric element 18.

When a drive signal is applied to the drive piezoelectric element 18, bending vibration in the fx mode is excited in the vibrating body 14. The bending vibration in the fx mode means bending vibration in the direction perpendicular to the side surface 14b on which the drive piezoelectric element 18 is formed. The deformation of the vibrating body 14 because of this bending vibration is detected, and is output as a detected signal from the split electrodes 20c, 20c respectively. The resultant of the detected signals output is fedback to the drive piezoelectric element 18 as a driving piece through the AGC circuit 32 and phase correction circuit 34. Thus, the vibrator 12 in the vibrating gyroscope 10 generates mechanically stable self-excited vibration.

Also, the output of the I-V conversion circuits 30, 30 is input to the differential amplifier 36 respectively. And the output from the differential amplifier 36 is input to the synchronous detection circuit, and synchronous detection is performed based on the signal from the AGC circuit 32. The output signal of the synchronous detection circuit 38 is input as an output signal from the vibrating gyroscope 10 through a smoothing circuit 40 and a DC amplifier 42.

While the vibrating gyroscope 10 generates vibration in the fx mode, bending vibration in the fy mode is induced in the vibrating body 14 owing to the Coriolis force when an angular velocity is applied and the vibrator 12 rotates around its axis. Here the bending vibration in the fy mode means vibration in the direction perpendicular to the direction of the vibration in the fx mode as shown in FIG. 7B. As a result, a voltage difference is generated between the divided electrode 20c and the divided electrode 20d of the detection piezoelectric element 20, and this voltage difference is output from the differential amplifier 36. As the output signal from the differential amplifier 36 is caused by the change of direction of the vibration of the vibrator 12, the output signal is the detection signal corresponding to the rotating angular velocity applied to the vibrating gyroscope 10. Therefore, after synchronous detection of the output signal from differential amplifier 36 has been performed in the synchronous detection circuit 38, through smoothing in the smoothing circuit 40 and amplification by the DC amplifier 42, a detection signal in accordance with the angular velocity applied to the vibrating gyroscope 10 can be obtained.

Next, with reference to FIGS. 7 through 11, the operation of the embodiment of the vibrating gyroscope 10 is explained.

Figure 7A:
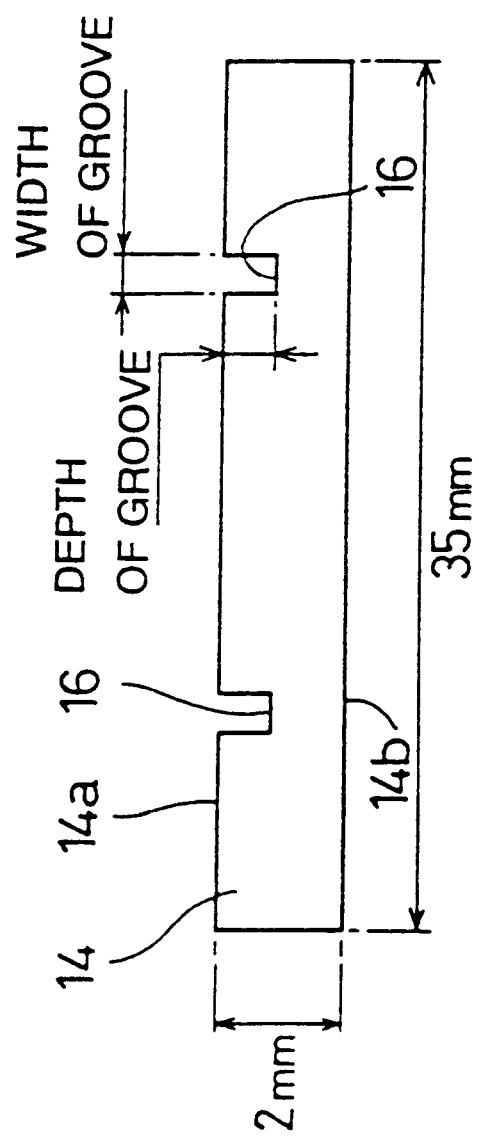
FIG. 7A is a diagrammatic side view showing an embodiment of a vibrating body to be used in the vibrating gyroscope shown in FIG. 1
Figure 7B:
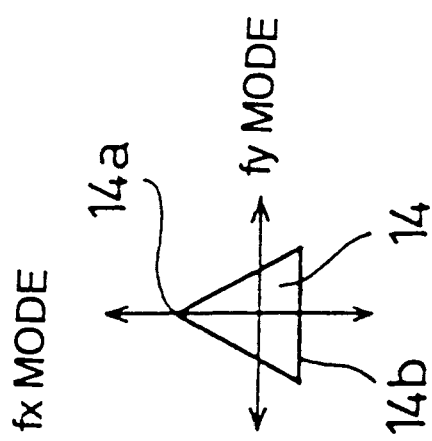
FIG. 7B is its diagrammatic front view.

FIG. 7A is a diagrammatic side view showing one specific embodiment of a vibrating body 14 to be used in the vibrating gyroscope 10 shown in FIG. 1, and FIG. 7B is its diagrammatic front view. The vibrating body 14 used here is a triangular prism with a total length of 35 mm and a height of 2 mm made up of elinvar. In the following explanation, the depth of the grooves 16 means the length from the edge line 14a to the bottom of the grooves 16, and the width of the grooves 16 means the length in the longitudinal direction of the vibrating body 14.

When the depth and width of the grooves 16 are set as 0.9 mm and 0.6 mm to 1.2 mm respectively in the vibrating gyroscope 10 using the vibrating body 14 shown in FIG. 7, the difference $\Delta f$ between the resonance frequency in the fx mode and the resonance frequency in the fy mode (hereinafter, simply referred to as the difference of resonance frequency) is shown as a graph in FIG. 8.

Figure 9:
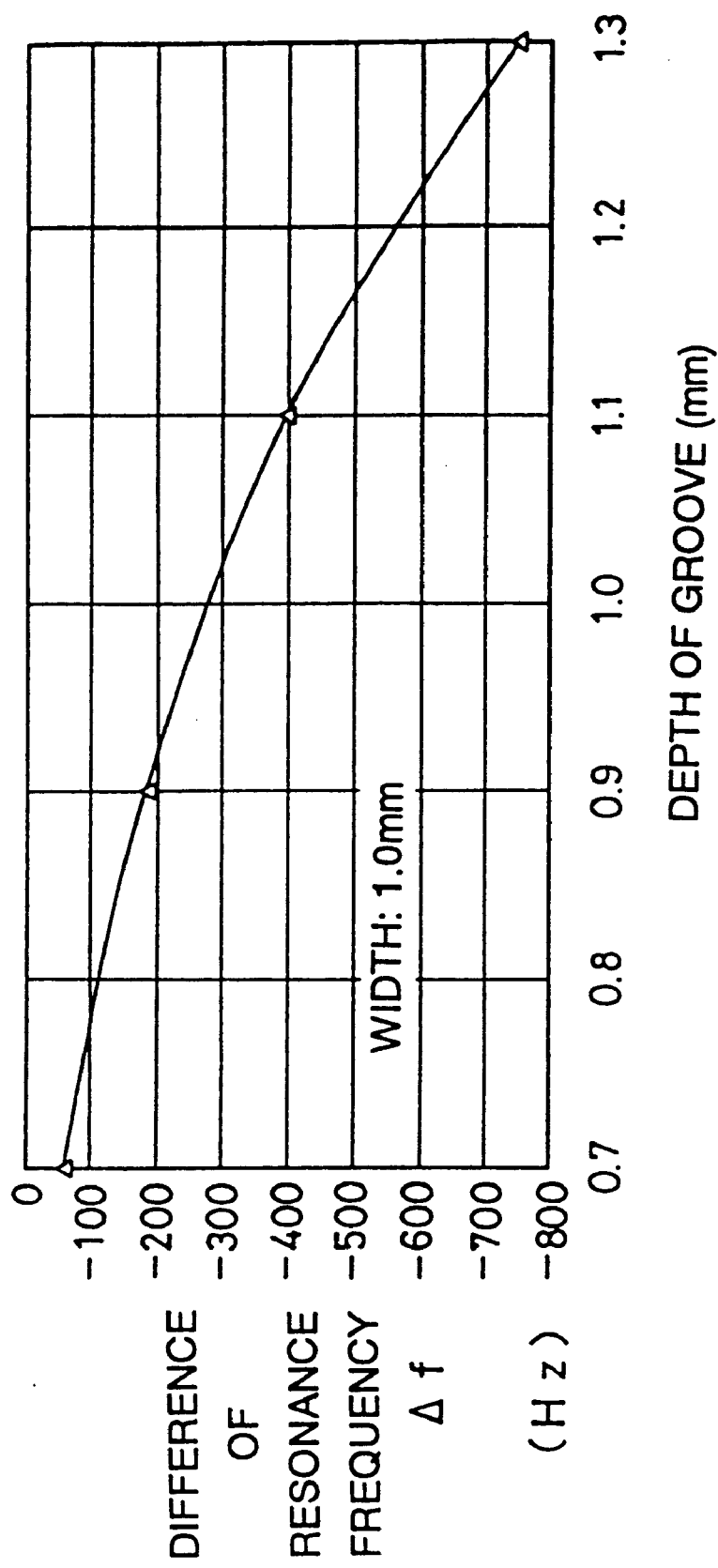
FIG. 9 is a graph showing the relation of the difference of resonance frequency to the depth of the slot in the vibrating gyroscope in FIG. 1.

Also, the graph in FIG. 9 shows the difference of resonance frequency Δf when the depth and width of the grooves 16 were set as 1.0 mm and 0.7 mm to 1.3 mm respectively in the vibrating body 14 shown in FIG. 7.

Figure 8:
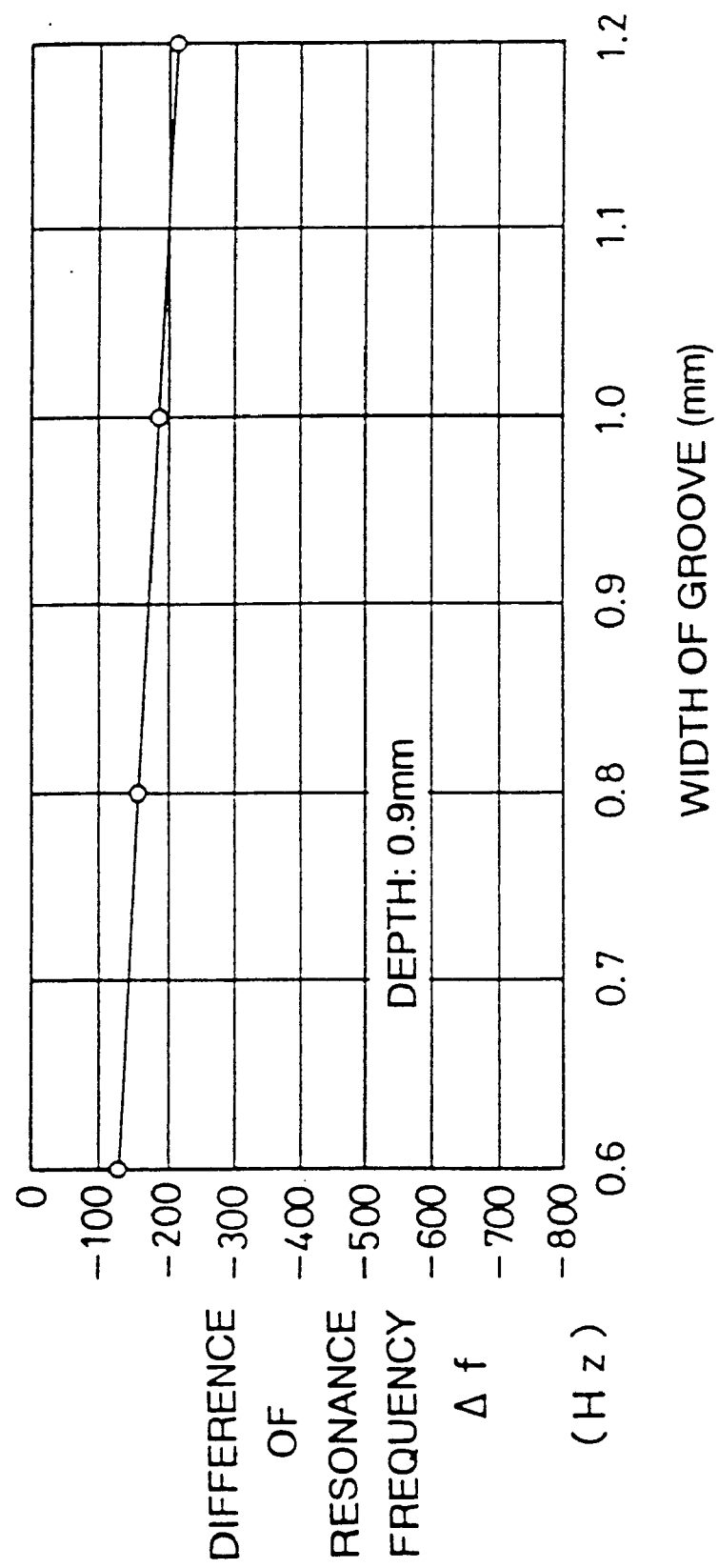
FIG. 8 is a graph showing the relation of the difference of resonance frequency to the width of the slot in the vibrating gyroscope in FIG. 1.

As clearly seen in FIGS. 8 and 9, the change of depth rather than the change of width of the groove 16 results in a larger change in the difference of resonance frequency Δf.

Figure 10:
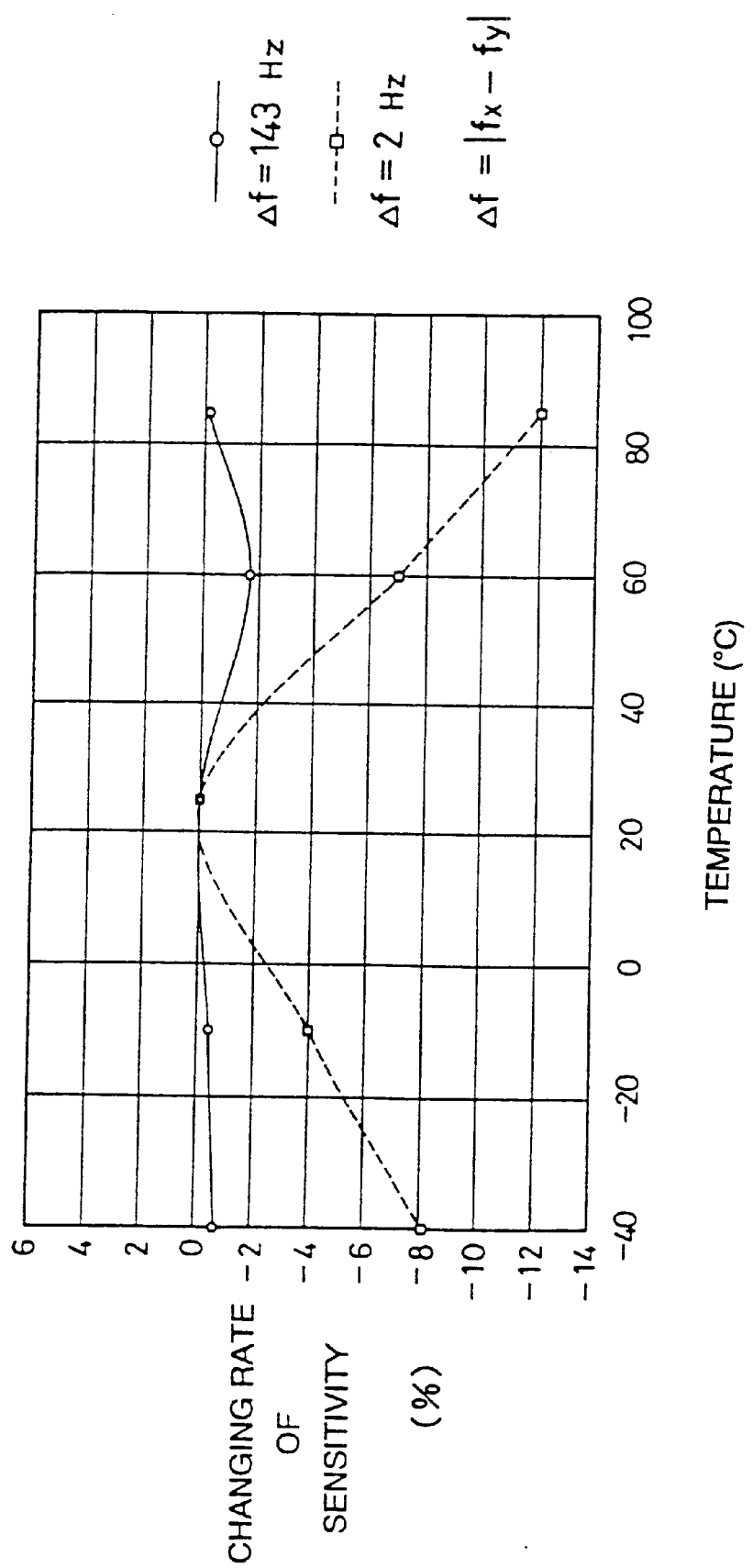
FIG. 10 is a graph showing the relation between the rate-of-change of sensitivity and the temperature in the vibrating gyroscope shown in FIG. 1.

FIG. 10 is a graph showing the relation among the difference of resonance frequency Δf, the temperature (°C.), and the changing rate of sensitivity (%) in the vibrating gyroscope 10 using the vibrating body 14 shown in FIG. 7. Here, the changing rate of sensitivity means the relative sensitivity referenced to the sensitivity at a temperature of 25° C. Also, the temperature means a temperature in the external environment. When the difference of resonance frequency Δf is 143 Hz, the relationship between the temperature and the changing rate of sensitivity is shown in a solid line, and when the difference of resonance frequency Δf is 2 Hz, the relationship between the temperature and the changing rate of sensitivity is shown in a broken line.

As clearly seen in FIG. 10, when the difference of resonance frequency is small, the changing rate of sensitivity owing to the temperature change is large, and on the other hand, when the difference of resonance frequency is large, the changing rate of sensitivity owing to the temperature change becomes small. It is preferable that the difference of resonance frequency Δf is within the range of about 50 to 150 Hz.

Figure 11:
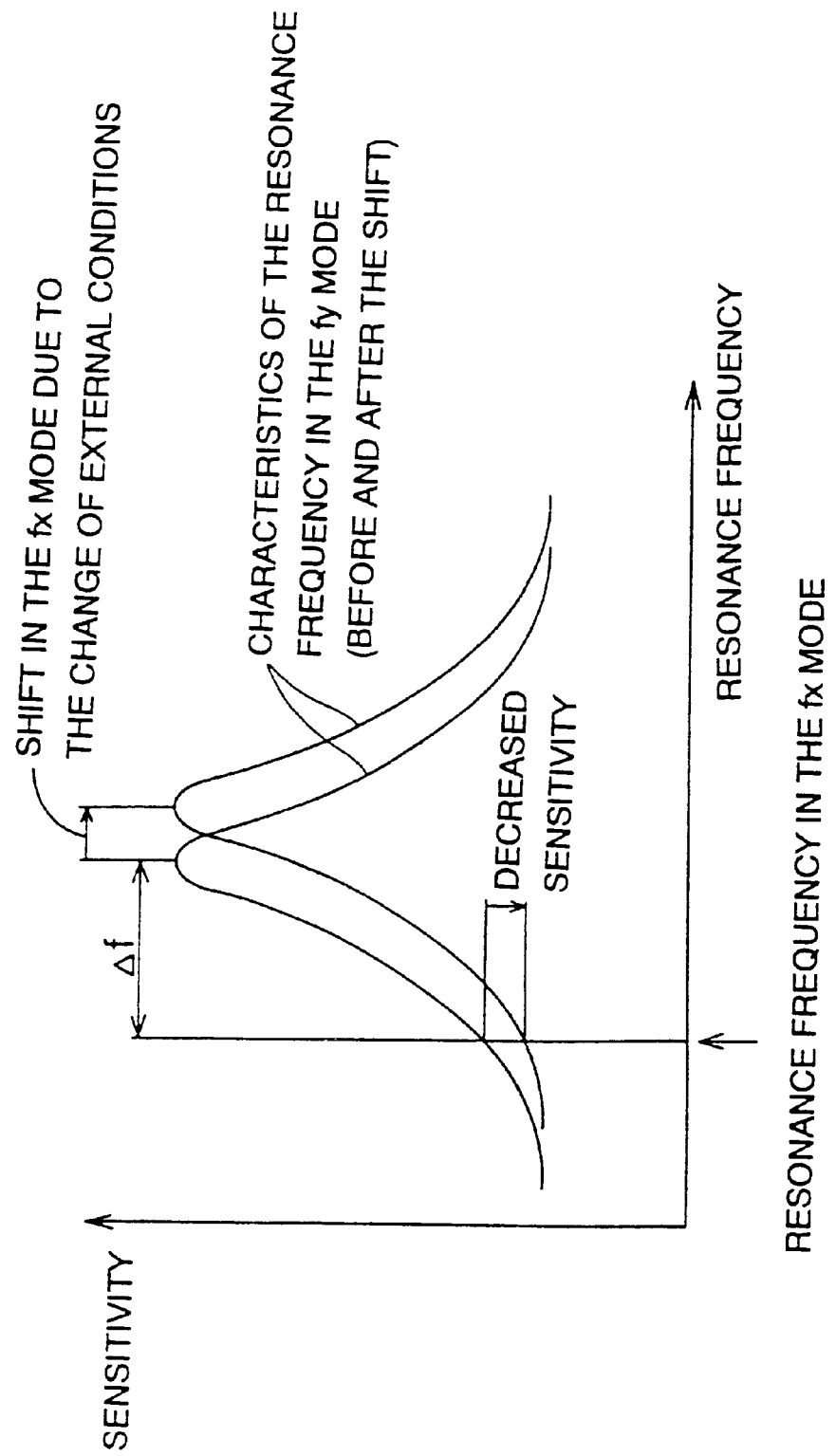
FIG. 11 is a graph showing the relation between the alteration of the characteristic of the resonance frequency in the fy mode due to the change of external conditions and the sensitivity for detecting rotating angular velocity.

FIG. 11 shows the relationship between the shift due to the change of external conditions of the resonance frequency characteristic in the fy mode and the sensitivity for detecting angular velocity in the vibrating gyroscope 10 relating to the present invention.

This vibrating gyroscope 10 is formed so that by adjustment of the shape of the groove 16 it is formed in advance so as to make the difference of resonance frequency Δf large and the resonance frequency in the fx mode corresponding to the frequency around which the characteristic curve of the resonance frequency in the fy mode has a bottom area of a slow slope. Therefore, even if the resonance frequency in the fx mode shifts due to the change of external conditions, the change of the detection sensitivity is made small.

As mentioned above, the vibrating gyroscope 10 shown in FIG. 1 is hardly affected by external impact, etc. because the support member 22 has the shape in which the arch portions are connected by two connecting portions. Especially, when the support member 22 is formed of a flat rectangular ring plate. Furthermore, as the grooves 16 are formed in the vicinity of the nodal points of the vibrator 12 and the vibrator 12 is supported by joining the tip of the protrusions 24 of the support member 22 to part of the bottom of the grooves 16, it is possible to support the vibrator 12 at the portion nearer to the nodal points. For that reason, the rigidity of the support member 22 makes it hard for the vibration of the vibrator 12 to be damped down and accordingly the leak of the vibration is made small.

Also, because in the vibrating gyroscope 10 shown in FIG. 1 the grooves 16 are formed in the shape of a slit which has a depth from the edge line 14a of the vibrator 12 toward the side surface 14b, the difference of resonance frequency Δf between the fx mode and the fy mode can be adjusted at a desired value by controlling the width and depth of the groove 16. Once the difference of resonance frequency Δf has been adjusted in advance to become large, the fluctuation of detecting sensitivity due to the change of external conditions can be decreased.

Figure 12:
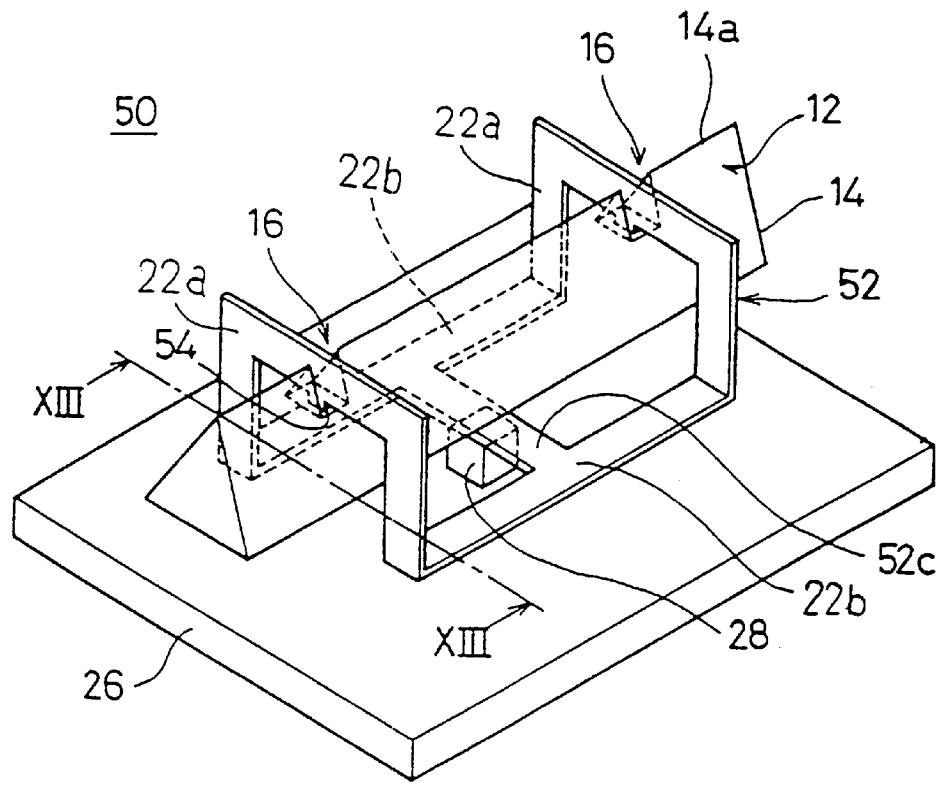
FIG. 12 is a perspective view showing a modified example of the vibrating gyroscope in FIG. 1.
Figure 13:
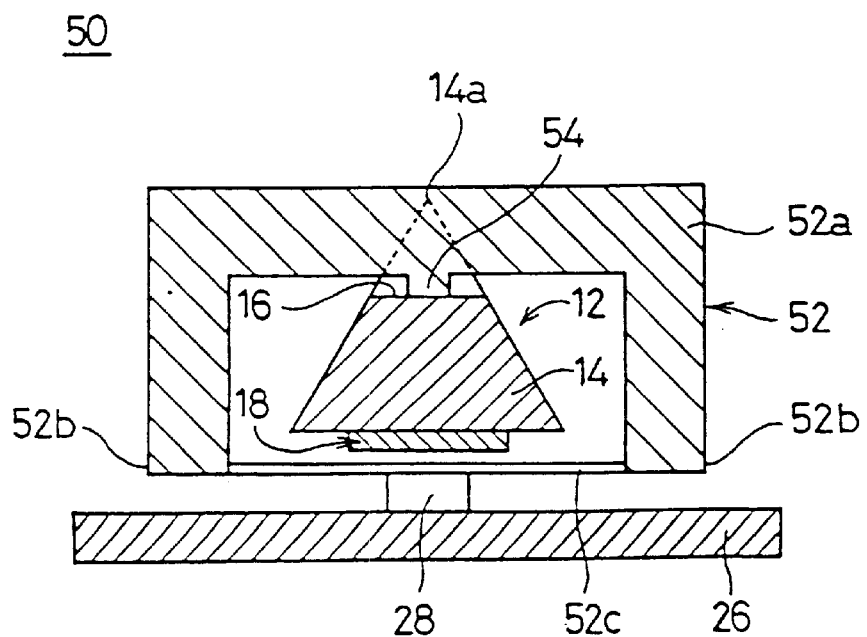
FIG. 13 is a cross-sectional view taken along line XIII—XIII of FIG. 12.

FIG. 12 is a perspective view of a modified example of the vibrating gyroscope shown in FIG. 1, and FIG. 13 is a sectional view taken on line XIII—XIII of FIG. 12. Note that the elements which are the same as those in the gyroscope 10 shown in FIG. 1 are denoted by the same reference numerals.

The vibrating gyroscope 50 shown in FIG. 12 is different in the construction of support from the vibrating gyroscope 10 in FIG. 1. This vibrating gyroscope 50 comprises a support member 52 to support the vibrator 12 so that it is suspended. The support member 52 is different form the support member 22 shown in FIG. 1 in that the support member 52 further includes a connecting portion 52c which connects between the center portions of the two connecting portions 22b.

The support member 52 is fixed to the mounting block 28 and the mounting block 28 is fixed on the mounting base 26.

Thus, the vibrator 12 is supported on the mounting base 26 through the mounting portion 28 so as to be hanged down by the support member 52.

The vibrating gyroscope 50 shown in FIG. 12 is also hardly affected by external impact, etc. and is able to give the same effects as the vibrating gyroscope 10 shown in FIG. 1.

Figure 14:
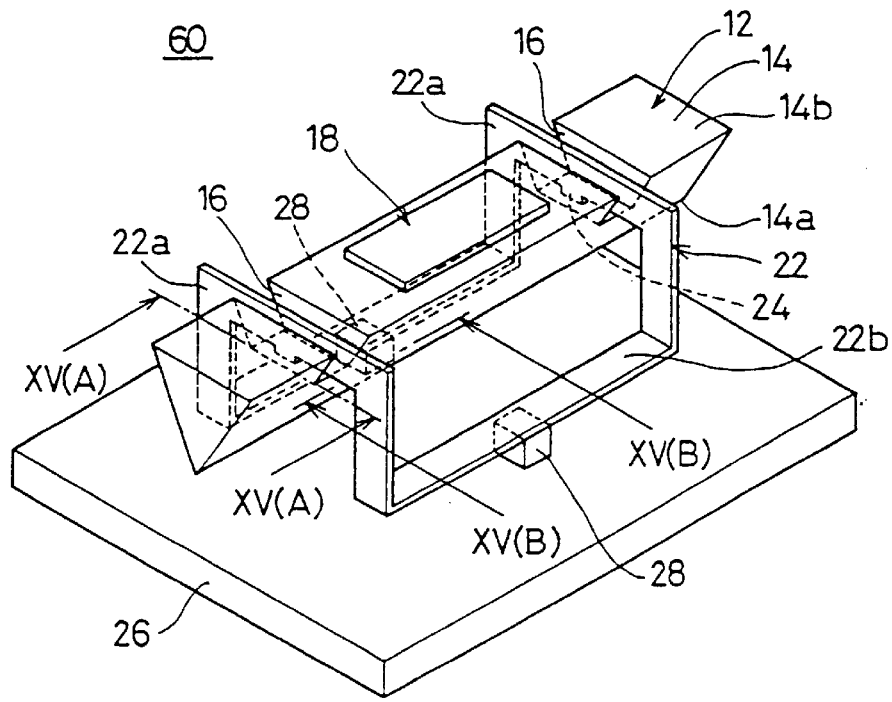
FIG. 14 is a perspective view showing another embodiment of a vibrating gyroscope relating to the present invention.
Figure 15A:
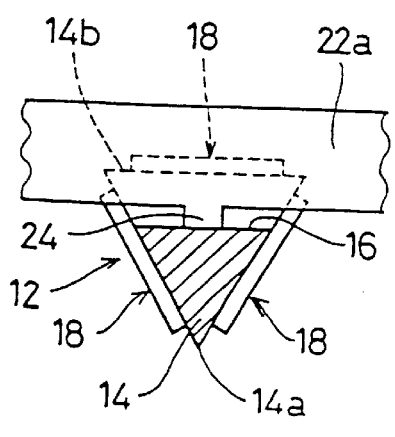
FIG. 15A is a sectional view taken along line XV(A)—XV(A) of FIG. 14.
Figure 15B:
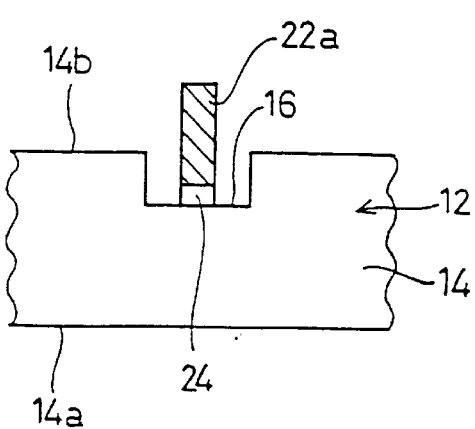
FIG. 15B is a sectional view taken along line XV(B)—XV(B) of FIG. 14.

Also, FIG. 14 is a perspective view showing another embodiment of the vibrating gyroscope relating to the present invention. FIG. 15A is a sectional view taken on line XV(A)XV(A) of FIG. 14, and FIG. 15B is a sectional view taken on line XV(B)—XV(B) of FIG. 14.

The vibrating gyroscope 60 shown in FIG. 14 is different in formation of the groove 16 and support of the vibrator 12 from the vibrating gyroscope 10. That is, in the vibrating gyroscope 60, the groove 16 extending in the direction perpendicular to the longitudinal direction of the vibrating body 14 is formed in the side surface 14b of the vibrating body 14 and in the vicinity of two nodal points in the vibrating body 14. The edge line 14a of the vibrator 12 is arranged on the side of the mounting base 26, and the side surface 14b is on the opposite side to the mounting base 26. Therefore, in the vibrating gyroscope 60, the side surface 14b is located as an upper side, and the vibrator 12 is supported with a front view of an upside-down triangle shape so as to be suspended over the mounting base 26.

As is shown in FIGS. 14 and 15, in the vibrating gyroscope 60 shown in FIG. 14, a drive piezoelectric element 18 is attached nearly in the middle of the side surface 14b of the vibrating body 14. Piezoelectric elements 18 of the same construction as the drive piezoelectric element 18 is attached as a detection piezoelectric element nearly in the middle of the two adjacent side surfaces with the edge line 14a of the vibrating body 14 therebetween. The two piezoelectric elements 18 as a detection piezoelectric element are connected to the IV conversion circuits 30, 30 in place of the divided electrodes 20c and 20d of the detection piezoelectric element 20 in the circuit diagram shown in FIG. 6.

Figure 16:
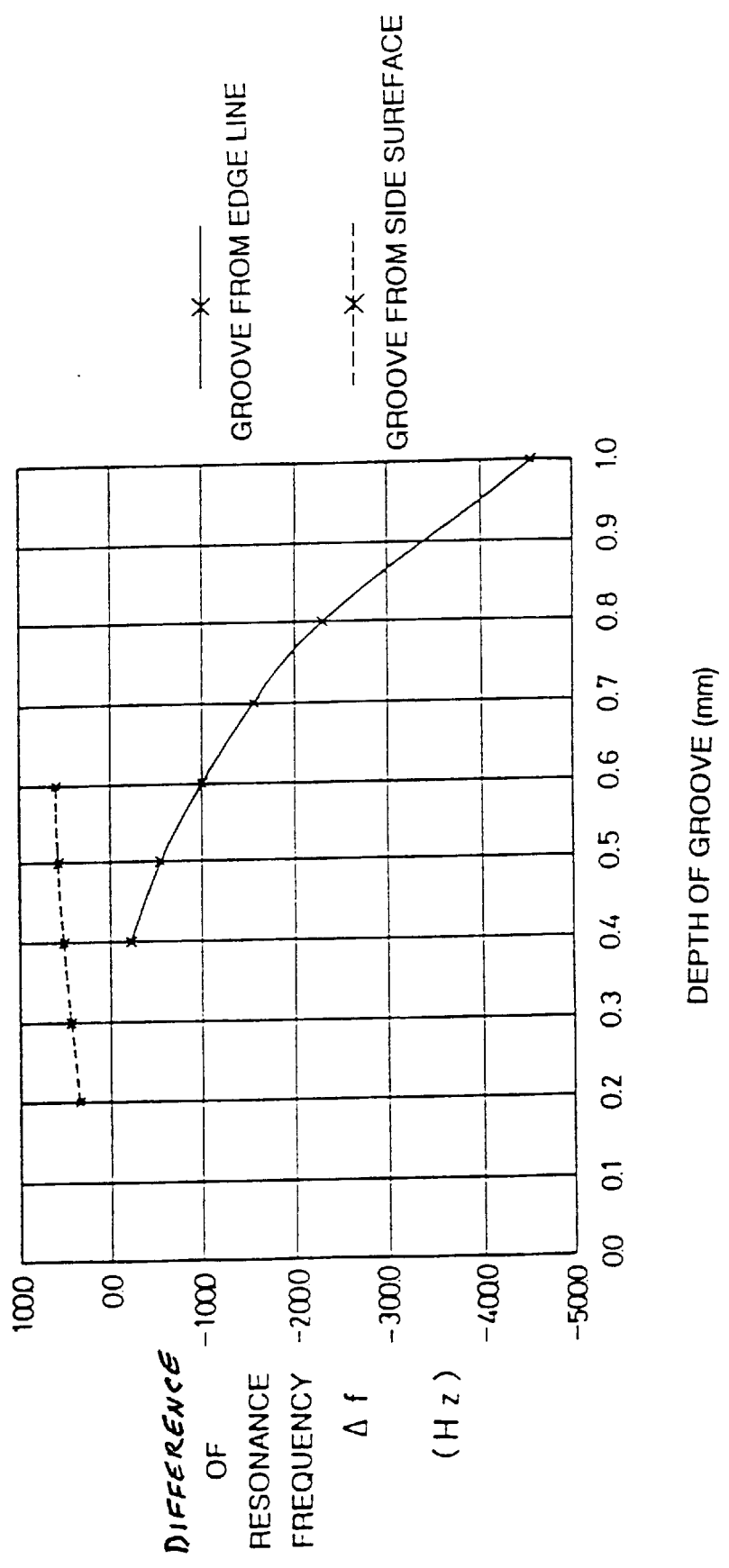
FIG. 16 is a graph for comparing the relation between the difference of resonance frequency and the depth of the slot at the time when the slot is formed from the edge line and the relation between the difference of resonance frequency and the depth of the slot at the time when the slot is formed from the side surface.

FIG. 16 is a graph showing the relation of the difference of resonance frequency Δf (Hz) to the location of the groove to be formed and the depth (mm) of the groove. In FIG. 16, when the groove 16 is formed from the side surface 14b, the relation between the depth of the groove and the difference of resonance frequency Δf is shown by a broken line, and when the groove 16 is formed from the edge line 14a, the relation between the depth of the groove and the difference of resonance frequency Δf is shown by a solid line. Note that the above figure is different in numerical value from FIG. 9, as the vibrating body used to obtain the result of evaluation in FIG. 9 is different in shape from the vibrating body used to obtain the result of evaluation shown in FIG. 16.

As clearly seen from the graph in FIG. 16, when in the vibrator 12 the groove 16 is formed in the side surface 16b, the difference of resonance frequency Δf between in the fx mode and the fy mode varies little even if the width of the groove 16 is changed.

The vibrating gyroscope 60 shown in FIG. 14 is hardly affected by external impact, etc. because of the same reasons mentioned above. Also, in the vibrating gyroscope 60, as the difference of resonance frequency Δf between in the fx mode and in the fy mode varies little, the detecting sensitivity of angular velocity becomes high.

Figure 17:
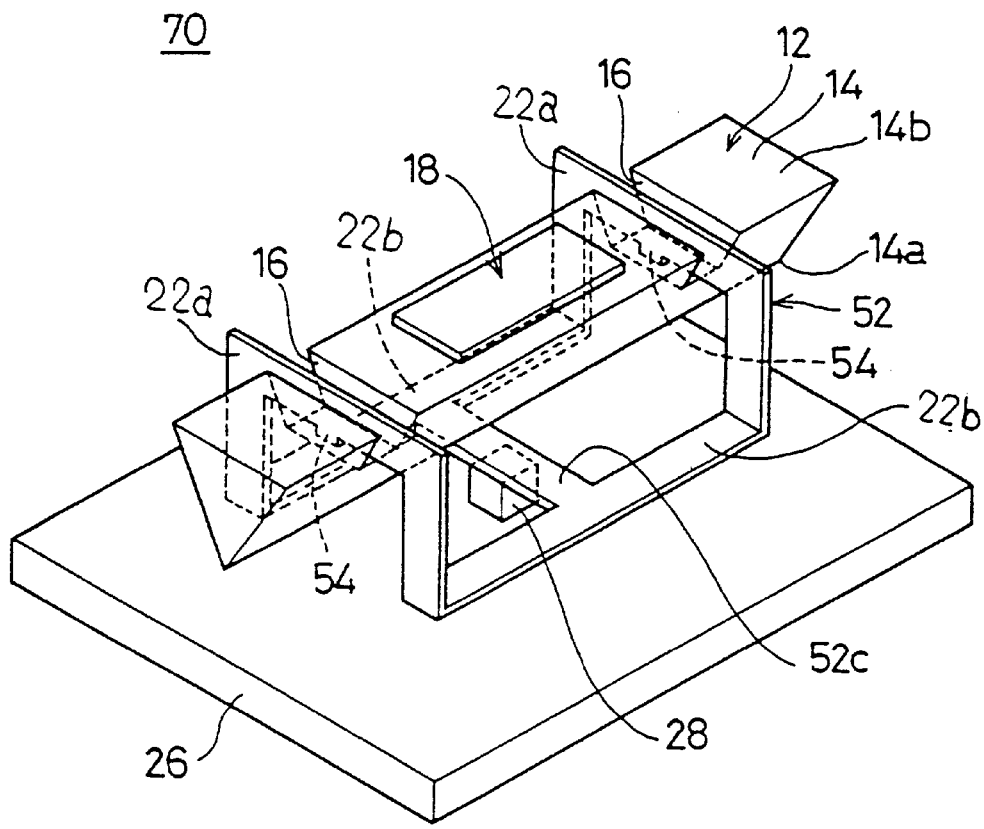
FIG. 17 is a perspective view showing a modified example of the vibrating gyroscope shown in FIG. 14.
Figure 18:
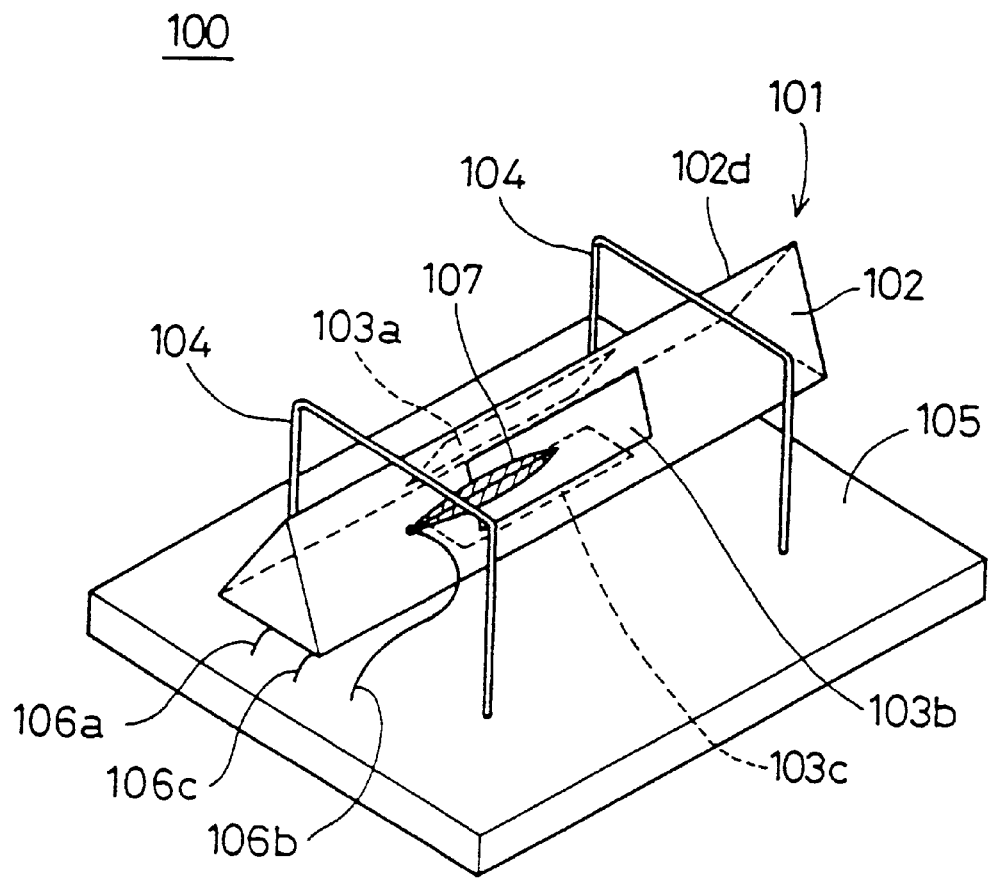
FIG. 18 is a perspective view showing an example of a conventional vibrating gyroscope.
Figure 19:
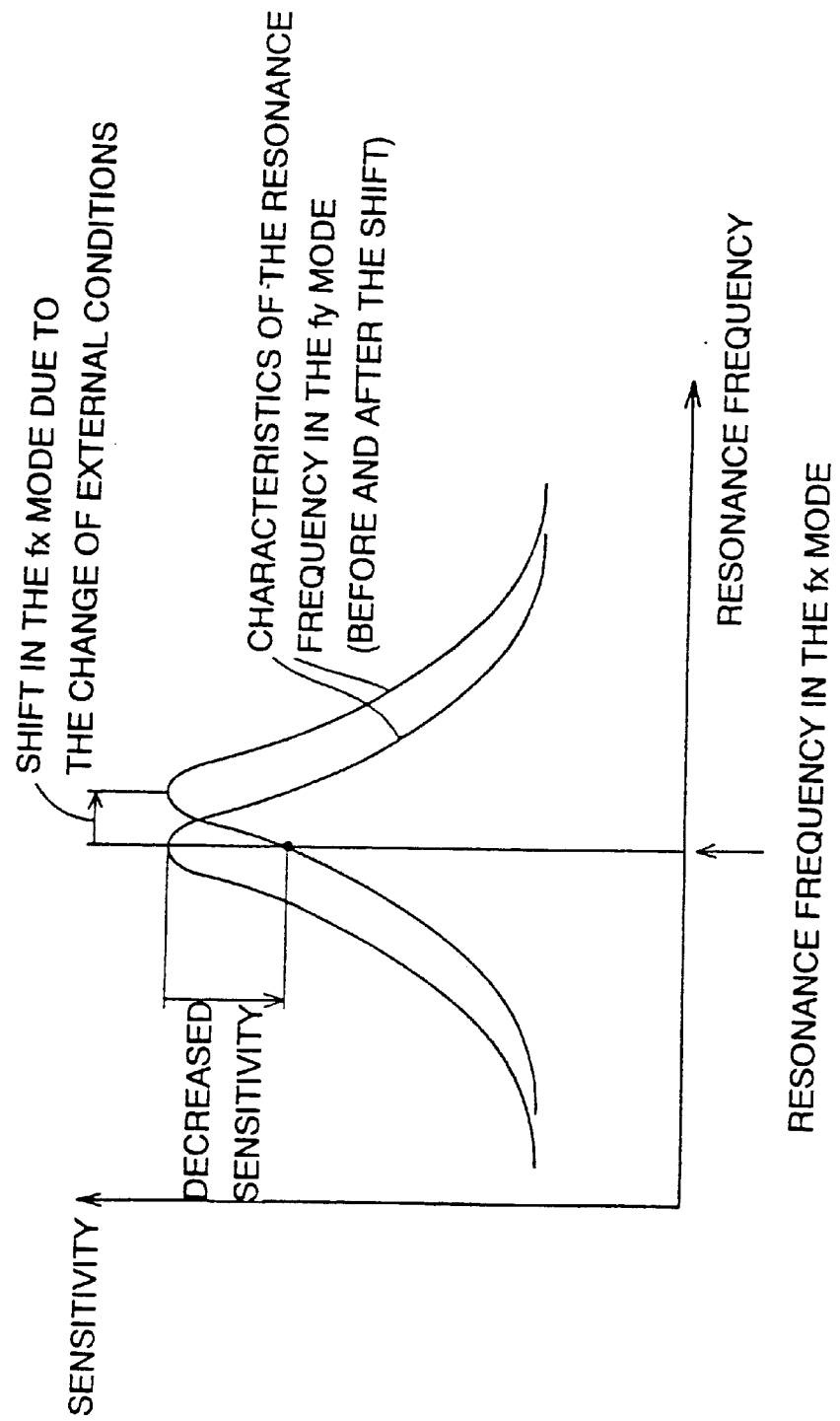
FIG. 19 is a graph showing the relation between the alteration of the characteristic of the resonance frequency in the fy mode due to the change of external conditions and the sensitivity for detecting rotating angular velocity in a conventional vibrating gyroscope.

FIG. 17 is a perspective view of a modified example of the vibrating gyroscope shown in FIG. 14. The vibrating gyroscope 70 shown in FIG. 17 is different in only construction of the support from the vibrating gyroscope 60 in FIG. 14.

That is, in the vibrating gyroscope 70 shown in FIG. 17 the support member 52 shown in FIG. 12 is employed. In addition, the support member 52 is fixed on the mounting base 26 through the mounting block 28.

Although in each of the above-mentioned embodiments, the vibrating body 14 having a nearly regular triangular prism shape is used, the vibrating body 14 may be formed in a square prism shape or other polygonal prism shapes, and also may be formed into a columnar shape. At this time, the difference of resonance frequency Δf between the fx mode and the fy mode can be freely adjusted by controlling the width and depth of the groove, and once the difference of resonance frequency Δf has been adjusted in advance, the alteration of the detection sensitivity owing to the change of external conditions may be reduced.

While preferred embodiments of the invention have been disclosed, various modes of carrying out the principles disclosed herein are contemplated as being within the scope of the following claims. Therefore, it is understood that the scope of the invention is not to be limited except as otherwise set forth in the claims.

What is claimed is:

1. A vibrating gyroscope, comprising:

a bar-shaped vibrator including a drive element for vibrating the bar-shaped vibrator and a detection element for detecting the vibration of the bar-shaped vibrator, the bar-shaped vibrator having two grooves therein which extend along a direction perpendicular to a longitudinal direction of the bar-shaped vibrator in the vicinity of two node points of the vibration of the bar-shaped vibrator, respectively; and a support member having a shape in which two arch portions held in a non-horizontal direction are connected by two connecting portions at both ends of the arch portions, wherein the arch portions of the support member are connected to the bar-shaped vibrator at respective bottoms of the grooves thereof, and the arch portions and connecting portions of the support member are integrally formed with each other.

2. A vibrating gyroscope according to claim 1, wherein the arch portions and connecting portions of the support member have wire shapes.

3. A vibrating gyroscope according to claim 2, wherein the arch portions and connecting portions of the support member have strip shapes.

4. A vibrating gyroscope according to claim 3, wherein the support member includes another connecting portion which is connected between middles of the connecting portions.

5. A vibrating gyroscope according to claim 3, wherein the support member is formed by bending opposite sides of a flat plate having the square ring shape in the same direction so that the arch portions in the shape of a reversed square bottomed letter "U" are formed.

6. A vibrating gyroscope according to claim 1, wherein the bar-shaped vibrator has a polygonal cross-section, and each of the grooves is provided in one side face of the bar-shaped vibrator.

7. A vibrating gyroscope according to claim 6, wherein depths of the grooves are adjusted such that resonance frequencies of two directions perpendicular with each other have a predetermined difference.

8. A vibrating gyroscope according to claim 7, wherein the predetermined difference is within the range of about 50 to 150 Hz.

* * * * *